United States Patent
Zhou et al.

(10) Patent No.: US 10,295,755 B1
(45) Date of Patent: May 21, 2019

(54) FIBER OPTIC ADAPTOR ASSEMBLY HAVING REMOVABLE CONNECTOR HOLDER

(71) Applicants: AMPHENOL FIBER OPTIC TECHNOLOGY (SHENZHEN) CO., LTD., Shenzhen, Guangdong Province (CN); GLORIOLE ELECTROPTIC TECHNOLOGY CORP., Kaohsiung (TW)

(72) Inventors: Jinan Zhou, Shenzhen (CN); Linghua Zhu, Shenzhen (CN); David Frey, Shenzhen (CN); Chia-Hua Wu, Kaohsiung (TW)

(73) Assignees: GLORIOLE ELECTROPTIC TECHNOLOGY CORP., Kaohsiung (TW); AMPHENOL FIBER OPTIC TECHNOLOGY (SHENZHEN) CO., LTD., Shenzhen, Guangdong Province (CN)

( * ) Notice: Subject to any disclaimer, the term of this patent is extended or adjusted under 35 U.S.C. 154(b) by 0 days.

(21) Appl. No.: 16/027,883

(22) Filed: Jul. 5, 2018

(30) Foreign Application Priority Data

Jan. 30, 2018 (TW) .............................. 107201448 U

(51) Int. Cl.
  *G02B 6/42* (2006.01)
  *G02B 6/38* (2006.01)

(52) U.S. Cl.
  CPC ......... *G02B 6/3825* (2013.01); *G02B 6/3817* (2013.01); *G02B 6/3874* (2013.01); *G02B 6/3897* (2013.01); *G02B 6/4277* (2013.01); *G02B 6/4292* (2013.01)

(58) Field of Classification Search
  CPC .. G02B 6/4292; G02B 6/4277; G02B 6/3897; G02B 6/3874; G02B 6/3817; G02B 6/3825
  See application file for complete search history.

(56) References Cited

U.S. PATENT DOCUMENTS

| | | | | |
|---|---|---|---|---|
| 6,193,420 B1 * | 2/2001 | Sikorski, Jr. | ......... | G02B 6/3825 174/67 |
| 6,474,876 B1 * | 11/2002 | Sikorski, Jr. | ......... | G02B 6/3825 174/67 |
| 6,853,795 B2 * | 2/2005 | Dagley | ................ | G02B 6/4452 385/134 |
| 7,751,672 B2 * | 7/2010 | Smith | .................. | G02B 6/4452 385/135 |
| 7,873,255 B2 * | 1/2011 | Reagan | ................ | G02B 6/3849 385/139 |
| 8,428,419 B2 * | 4/2013 | Leblanc | ............... | G02B 6/4457 385/135 |

(Continued)

*Primary Examiner* — Akm E Ullah
(74) *Attorney, Agent, or Firm* — Muncy, Geissler, Olds & Lowe, P.C.

(57) ABSTRACT

A fiber optic adaptor assembly, to be inserted into a metal faceplate of a fiber distribution hub, includes a main body, a connector holder and a conductive ring member. The connector holder is removably inserted into an installation hole of the main body. The conductive ring member is removably sleeved around an outer periphery of the main body. The conductive ring member electrically contacts and cooperates with the metal faceplate to provide a shielding effect against electromagnetic interferences when the main body is inserted into the faceplate.

16 Claims, 9 Drawing Sheets

(56) References Cited

U.S. PATENT DOCUMENTS

| | | | | |
|---|---|---|---|---|
| 8,872,028 B2* | 10/2014 | Ito | ............... | H01R 9/0512 |
| | | | | 174/78 |
| 9,411,118 B2* | 8/2016 | Matz | ............... | G02B 6/4452 |
| 2002/0159712 A1* | 10/2002 | Holmquist | ............... | G02B 6/3825 |
| | | | | 385/70 |
| 2010/0051303 A1* | 3/2010 | Ullrich | ............... | B25D 16/006 |
| | | | | 173/48 |

* cited by examiner

FIBER OPTIC ADAPTOR ASSEMBLY HAVING REMOVABLE CONNECTOR HOLDER

CROSS-REFERENCE TO RELATED APPLICATION

This application claims priority of Taiwanese Patent Application No. 107201448, filed on Jan. 30, 2018.

FIELD

The disclosure relates to an adaptor assembly, and more particularly to a fiber optic adaptor assembly.

BACKGROUND

Referring to FIG. 1, conventionally, a plurality of first fiber optic adaptors 11 and a plurality of second fiber optic adaptors 12 are connected to an optical fiber distribution hub 10. The optical fiber distribution hub has a box body 101, and a faceplate 102 connected to the box body 101 and formed with a coupling opening 108 and a plurality of insertion holes 109 extending into the box body 101. The first fiber optic adaptors 11 are inserted into the coupling opening 108. The second fiber optic adaptors 12 are respectively inserted into the insertion holes 109.

In order to provide densified and complexed fiber optic network arrangements for satisfying a need to transmit massive information, it is necessary to simultaneously use different types of the first and second fiber optic adaptors 11, 12 during constructing distribution networks of optical fibers. Even other types of fiber optic adaptors are additionally needed for use with the first and second fiber optic adaptors 11, 12 when it is required to match with the complexity of network arrangements. On the other hand, to avoid signal interferences caused by high density of the optical fibers, each first fiber optic adaptor 11 has a first metal plate 13 inserted therein, and each second fiber optic adaptor 12 has a second metal plate 14 inserted therein. By virtue of metallic properties of the first and second metal plates 13, 14, a shielding effect is achieved to prevent signal interferences caused by the high density of optical fibers.

However, simultaneous use of different types of first and second fiber optic adaptors 11, 12 has increased difficulties in the installation of network arrangements and the manufacture of adaptors. In addition, in order to accommodate different types of the first and second fiber optic adaptors, a faceplate with a particular structure has to be selected. In other words, to provide densified and complexed network arrangements, there are needs to overcome several problems encountered in the construction and manufacture of adaptors. Further, provision of the first and second metal plates 13, 14 for avoiding signal interferences needs an insertion process (e.g., insert molding), which increases fabrication costs and also affect production efficiencies. Aside from the need to use the inserting process for the first and second metal plates 13, 14, it is required to consider which type of the faceplate can match with the inserted first and second metal plates 13, 14, thereby facing additional inconveniences.

SUMMARY

Therefore, an object of the disclosure is to provide a fiber optic adaptor assembly that can alleviate at least one of the drawbacks of the prior art.

According to the disclosure, a fiber optic adaptor assembly to be inserted into a metal faceplate of a fiber distribution hub includes a maim body, at least one connector holder and a conductive ring member.

The main body is formed with at least one installation hole.

The least one connector holder is removably inserted into the at least one installation hole.

The conductive ring member is made from an electrically conductive material and removably sleeved around an outer periphery of the main body. The conductive ring member electrically contacts and cooperates with the metal faceplate to provide a shielding effect against electromagnetic interferences when the main body is inserted into the faceplate.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
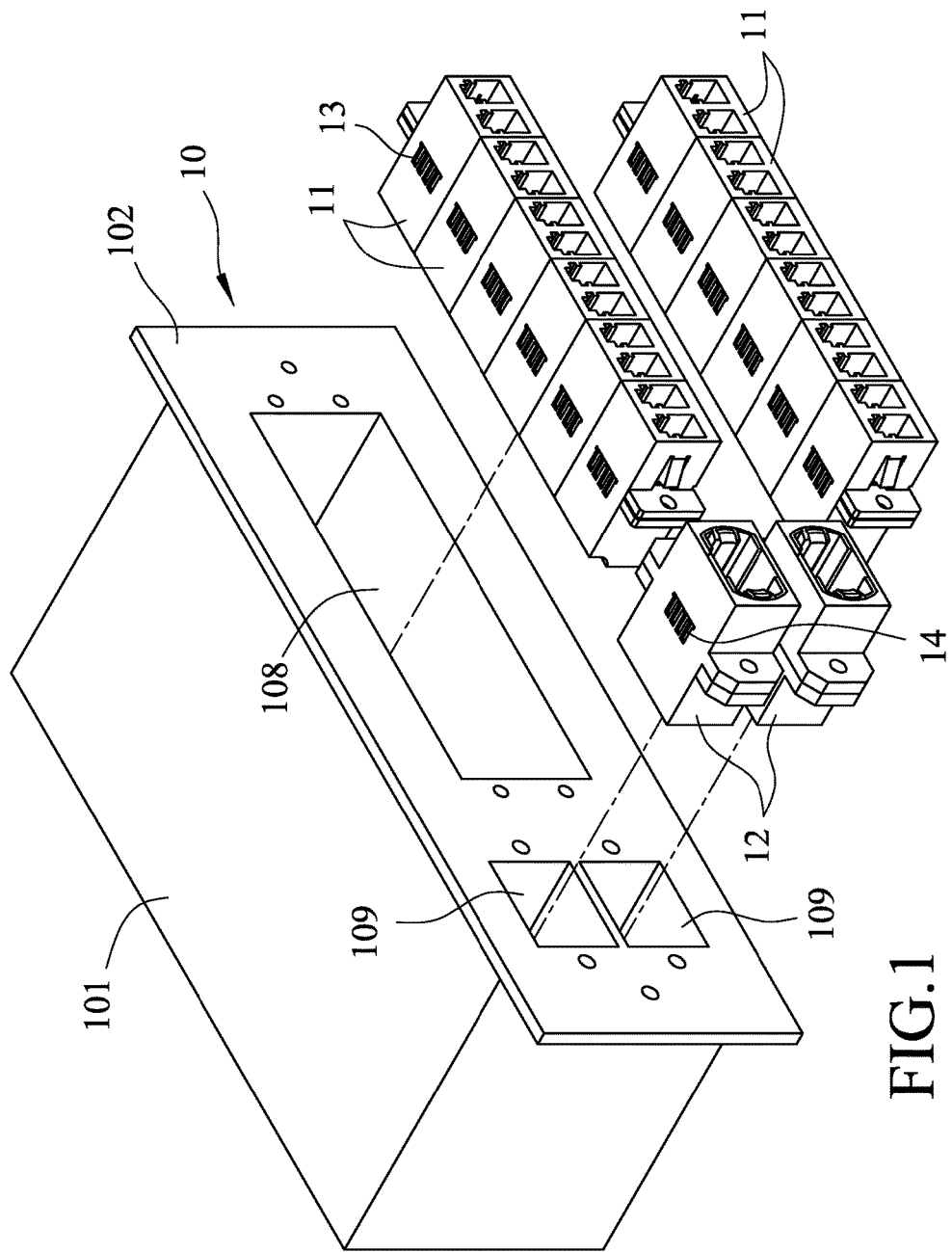
FIG. 1 is an exploded perspective view illustrating conventional adaptor assemblies connected to an optical fiber distribution hub.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
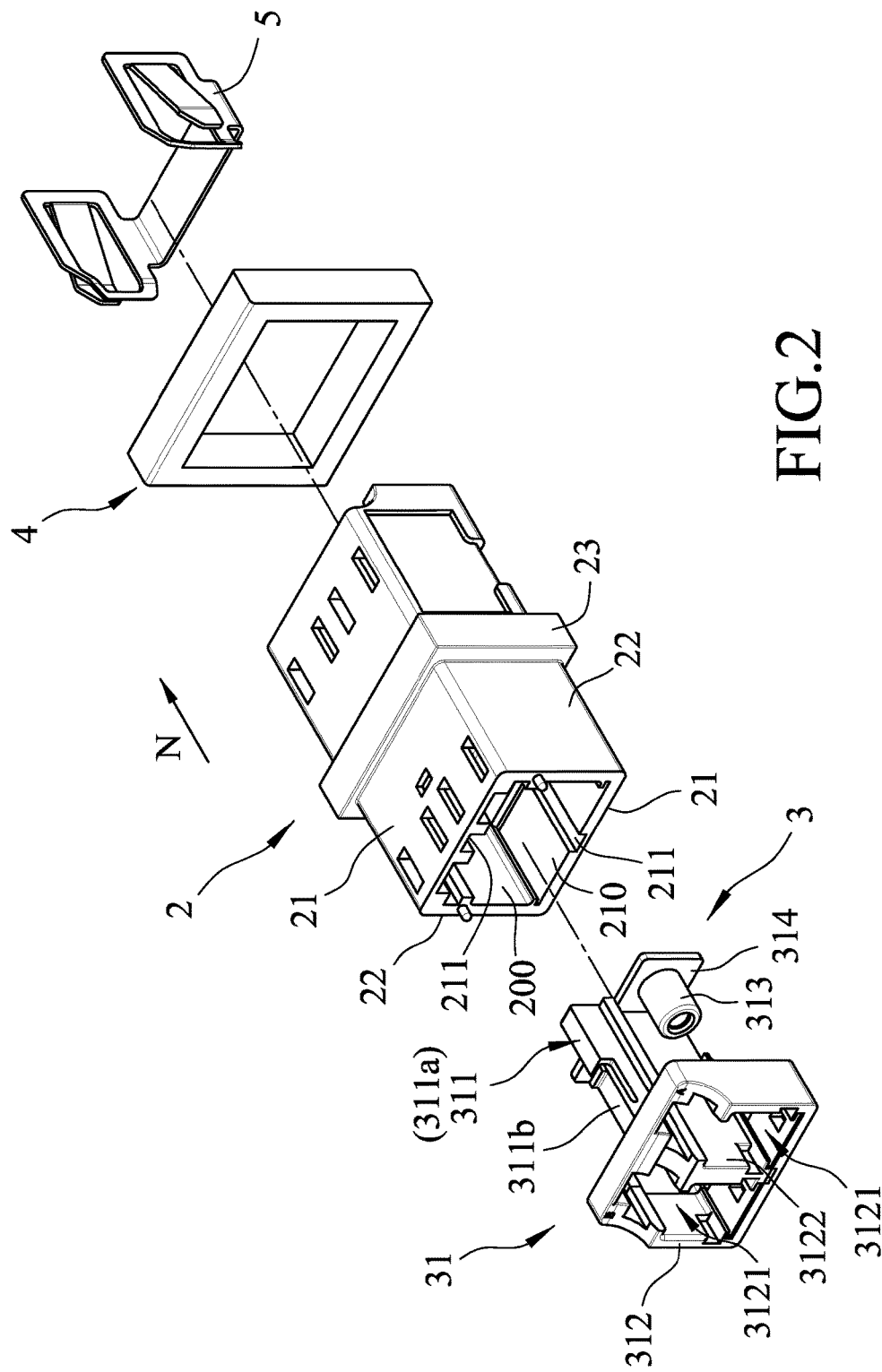
FIG. 2 is an exploded perspective view of a fiber optic adaptor assembly according to a first embodiment of the disclosure.
Figure 3:
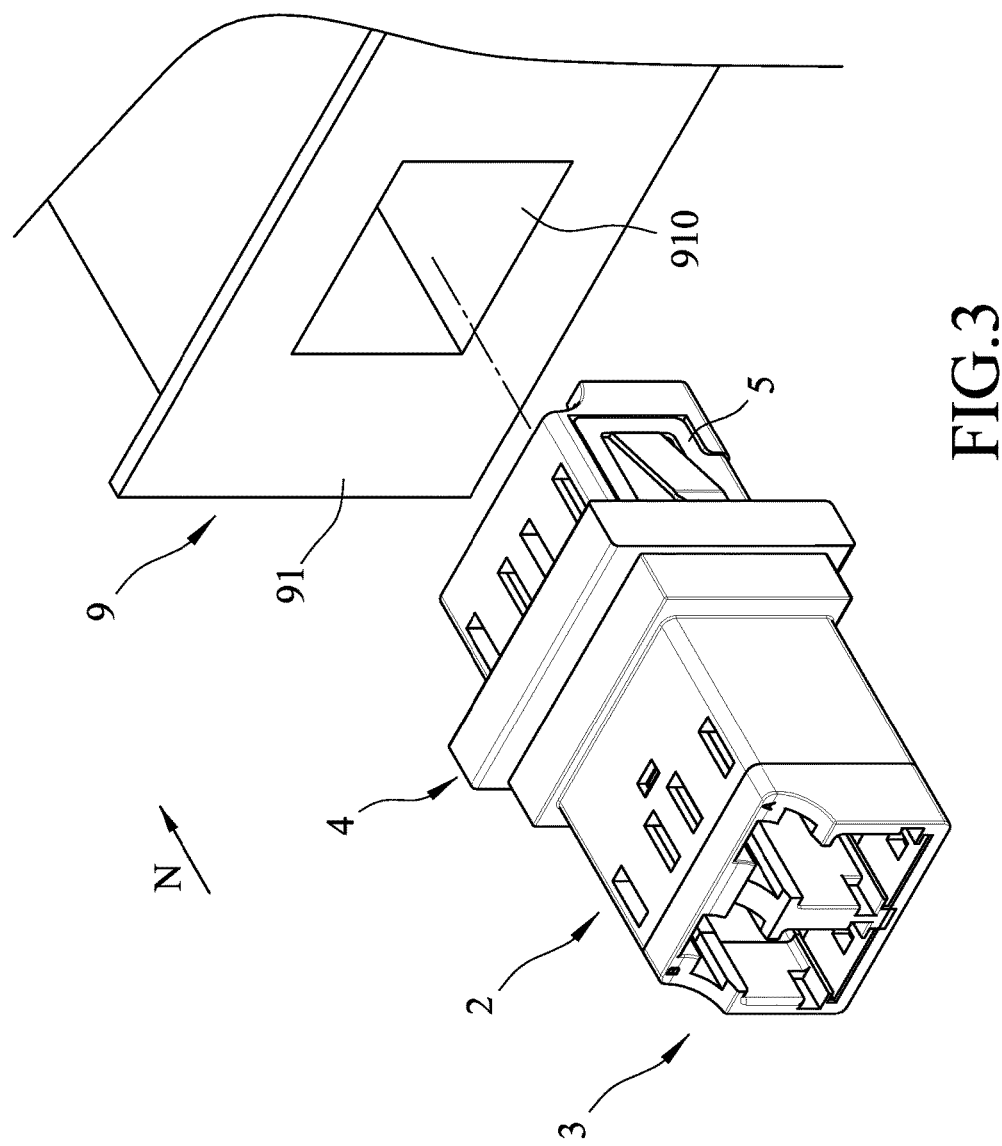
FIG. 3 illustrates the fiber optic adaptor assembly of the first embodiment and a metal faceplate of a fiber distribution hub in an unassembled state.

Referring to FIGS. 2 and 3, a fiber optic adaptor assembly according to a first embodiment of the disclosure is suitable to be inserted into a metal faceplate 91 of a fiber distribution hub 9. The metal faceplate has a plurality of insertion holes 910 (only one is shown). The fiber optic adaptor assembly includes a main body 2, a connector holder set 3, a conductive ring member 4 and a metal clip 5. The metal clip 5 is attached to an outer periphery of the main body 2 in a clamping manner and is able to interlock with the metal faceplate 91.

The main body 2 includes two parallel spaced-apart base plates 21, two lateral plates 22 each of which is connected between the base plates 21, and a flange 23 that is looped around the base plates 21 and the lateral plates 22. The base plates 21 and the lateral plates 22 cooperatively bound an installation hole 200. Each base plate 21 has an inner surface 210 facing the installation hole 200, and a sliding track member 211 that is formed on the inner surface 210 in communication with the installation hole 200 and that extends in an insertion direction (N) of the connector holder set 3. In this embodiment, the sliding track member 211 is a groove (hereinafter referred to as slide groove 211).

Figure 4:
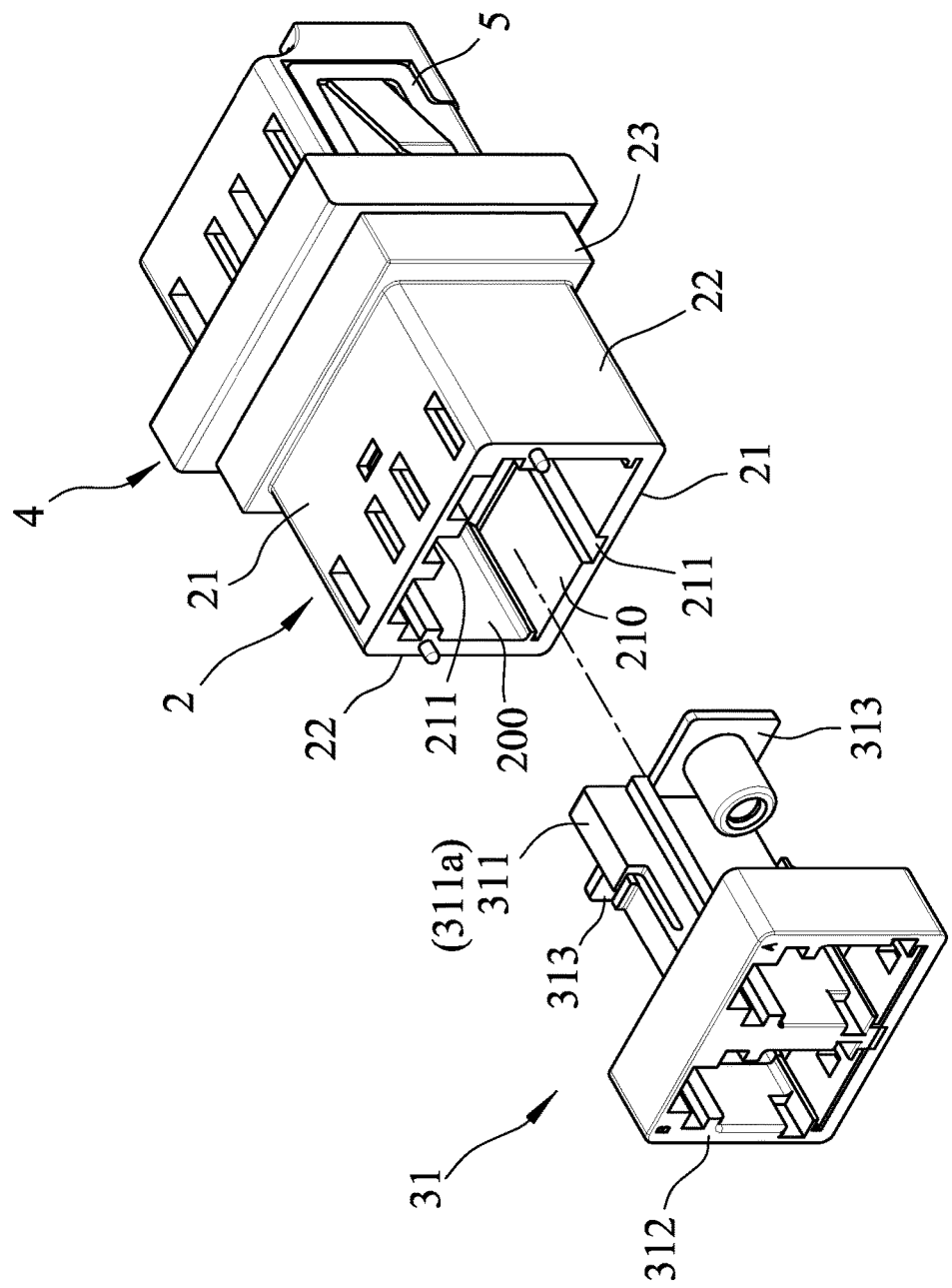
FIG. 4 illustrates the first embodiment which, however, has a different connector holder.

Referring to FIG. 4, in combination with FIG. 2, the connector holder set 3 includes multiple connector holders 31 (only one is shown in each of FIGS. 2-4) which have different configurations for selection by users and for being interchangeably inserted into the installation hole 200. In this embodiment, there are two different types of connector holders 31, one being shown in FIGS. 2 and 3 and the other being shown in FIG. 4. Each connector holder 31 has an insertion portion 311, a frame-shaped head portion 312, two connecting plates 314 and two alignment sleeves 313. The insertion portion 311 extends into the installation hole 200 and slidably engages the sliding grooves 211 of the base plates 21. The insertion portion 311 has two opposite sliding engagement parts 311a (only one is visible in FIG. 2 or 4) respectively and slidably engaging the sliding grooves 211, and a retention tongue 311b resiliently projecting from the insertion portion 311 for releasably interlocking with one of the base plates 21. The frame-shaped head portion 312 is connected to one end of the insertion portion 311 outwardly of the installation hole 200. The two connecting plates 314 respectively and transversely project from two opposite sides (i.e., left and right sides in FIG. 2) of the insertion portion 311. The two alignment sleeves 313 are respectively disposed on the connecting plates 314 inside the installation hole 200. Based on standard specifications of various fiber optic adaptors, the connector holders 31 can be manufactured by providing the frame-shaped head portions 312 with different configurations for selection by users so that, when a selected one of the connector holders 31 is assembled to the main body 2, the resulting assembly can present the characteristics of a particular type of adaptor required by the users. In one implementation, the frame-shaped head portions 312 are so configured as to be matable with fiber optic connectors, such as Lucent or Local Connectors (LC), Subscriber or Standard Connectors (SC) and Multi-Fiber Push On connectors (MPO connectors).

According to this embodiment, the frame-shaped head portion 312 has two connector-receiving openings 3121 respectively aligned with the alignment sleeves 313, and a separation plate 3122 disposed between the connector-receiving openings 3121. Because the connector holders 31 having different configurations of the frame-shape head portions 312 can be interchangeably inserted into the installation hole 200, installation operators are allowed to change quickly the adaptor assembly of the disclosure from one form to another by making a choice from different connector holders 31. Installation of an optical fiber network can therefore be facilitated. Further, the connector holders 31 may be provided with different identification colors so that the different configurations of the connector holder 31 can be identified easily by merely observing the identification colors, thereby enhancing efficiency of installation.

The conductive ring member 4 includes a resilient seal ring that is made from a conductive cloth. The conductive ring member 4 is resiliently stretchable so that it is easy to sleeve the conductive ring member 4 around the outer periphery of the main body 2 and to detach it from the main body 2. The details of how the conductive ring member 4 can provide a shielding effect against electromagnetic interferences will be described hereinafter.

Figure 5:
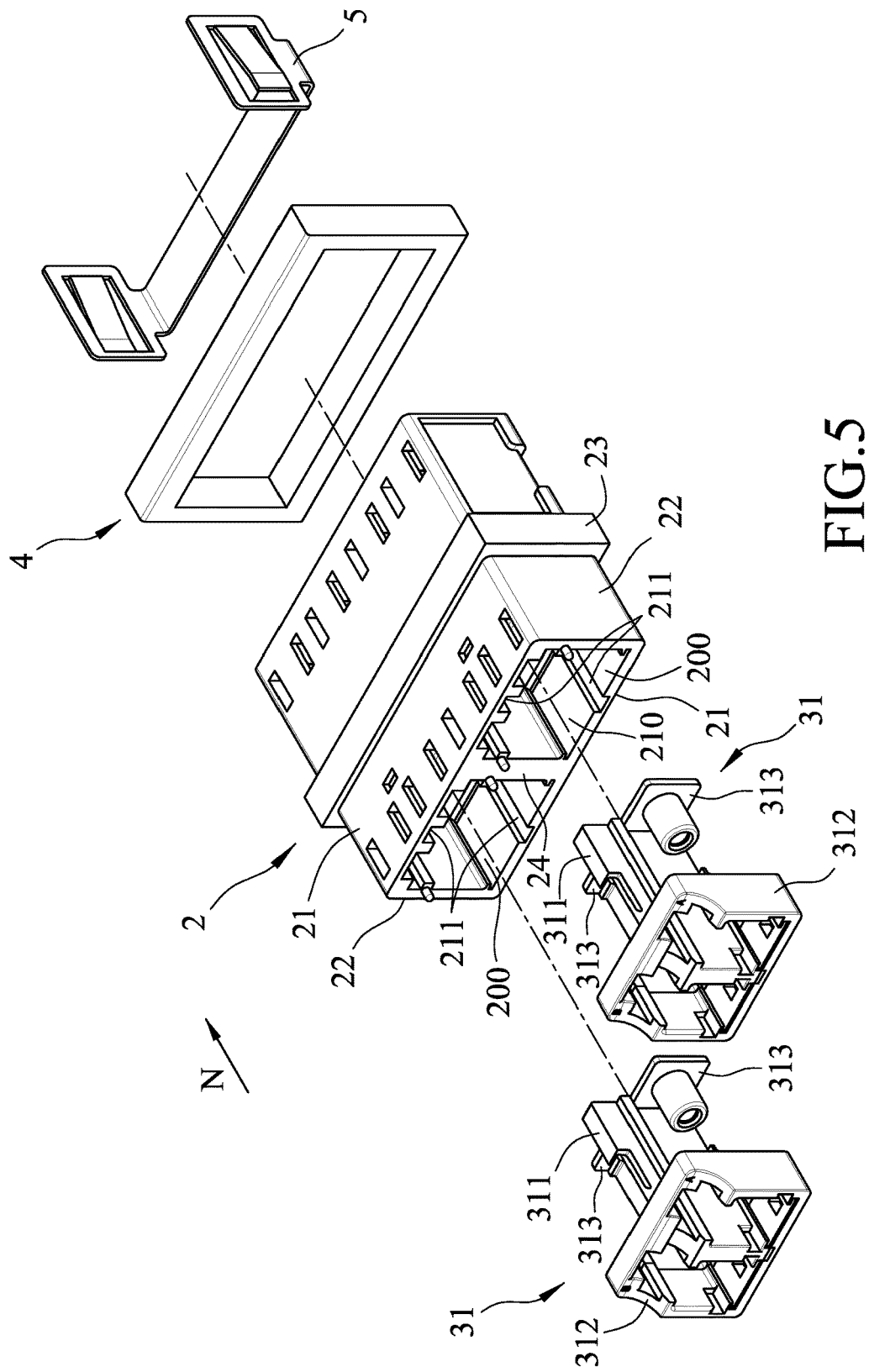
FIG. 5 is an exploded view illustrating a fiber optic adaptor assembly according to a second embodiment of the disclosure.
Figure 6:
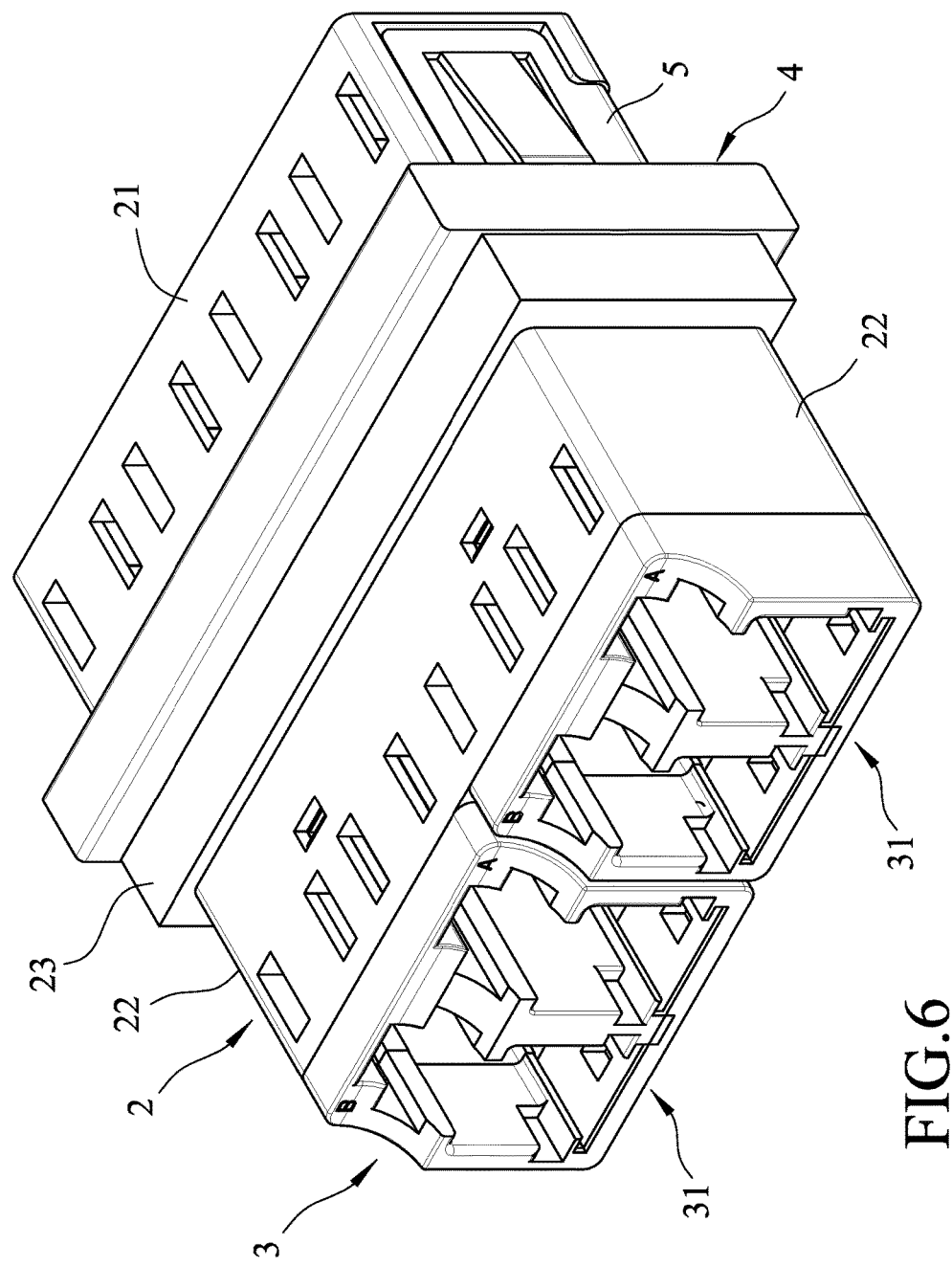
FIG. 6 is a perspective view of the second embodiment.

FIGS. 5 and 6 illustrate a fiber optic adaptor assembly according to the second embodiment of the disclosure. In the second embodiment, the base plates 21 and the metal clip 5 are lengthened in a direction transverse to the insertion direction (N) of the connector holder 31. The main body 2 further includes a partition plate 24 that transversely connects between the base plates 21 and that is disposed between the lateral plates 22. The base plates 21 and the lateral plates 22 cooperatively bounding two installation holes 200. The installation holes 200 are respectively disposed on two opposite sides of the partition plate 24. Each of the base plates 21 has two sliding track members 211 respectively disposed on the two opposite sides of the partition plate 24 and extending in the insertion direction (N) of the connector holder 31. Two connector holders 31 are respectively inserted into the installation holes 200. In other words, the main body 2 can be assembled with two connector holders 31 at the same time for coupling fiber optic cables having different polarity arrangements. While, in the second embodiment, the connector holders 31 are illustrated to be the same as an example, the two connector holders 31 may be of different types in other examples.

Figure 7:
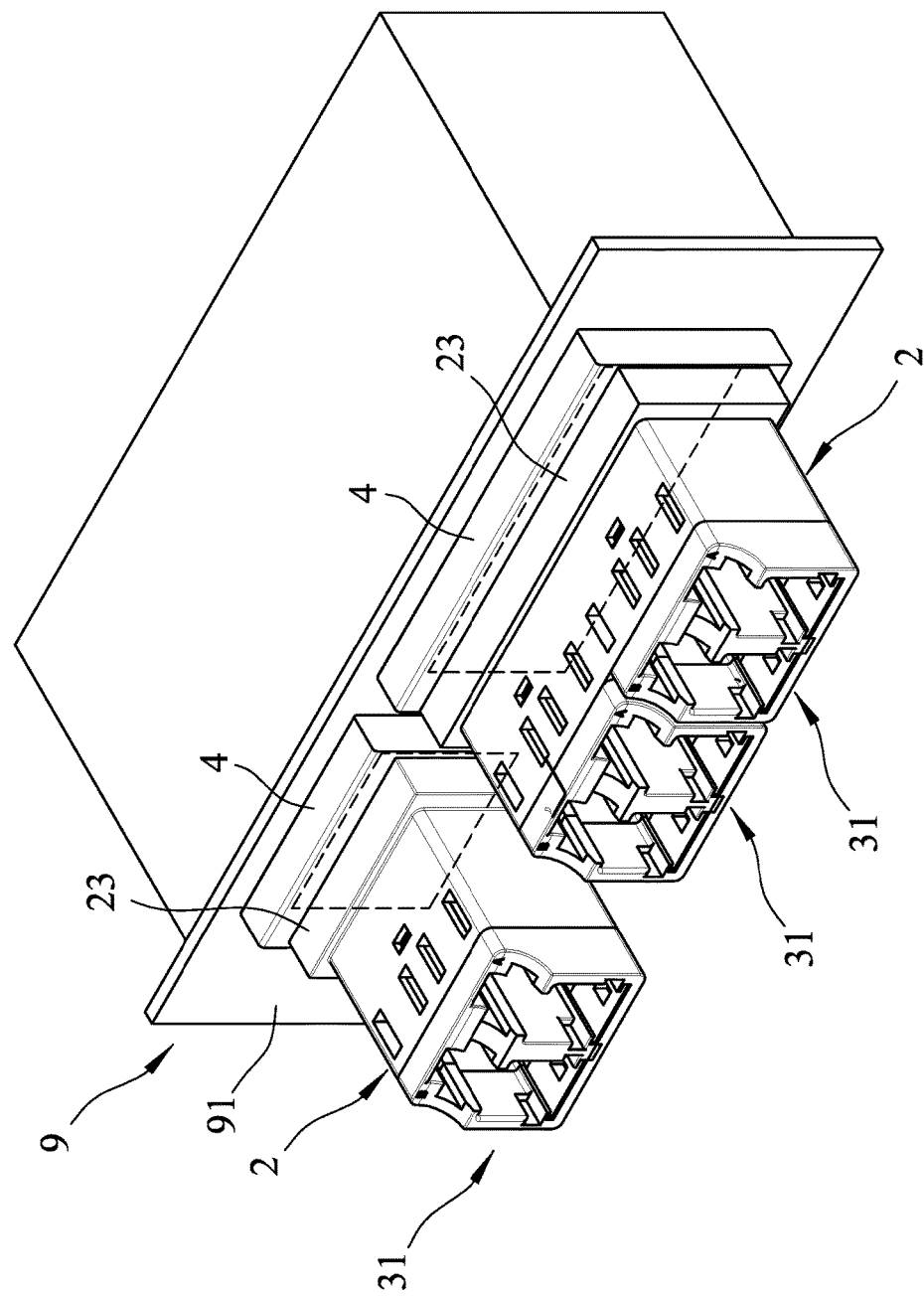
FIG. 7 illustrates the fiber optic adaptor assemblies of the first and second embodiments assembled to a faceplate.

Referring to FIG. 7, the main bodies 2 of the first and second embodiments are shown as being inserted into the faceplate 91. The conductive ring members 4 are respectively sleeved around the main bodies 2 of the first and second embodiments between the metal faceplate 91 and the flanges 23 of the main bodies 2. By virtue of electrical conductivity of the conductive ring members 4, the conductive ring members 4 electrically connect the metal faceplate 91 and are able to absorb and transfer electromagnetic radiations to the metal faceplate 91 which is grounded. Each conductive ring member 4 and the metal faceplate 91 cooperatively provide a shielding effect against electromagnetic interferences.

Figure 8:
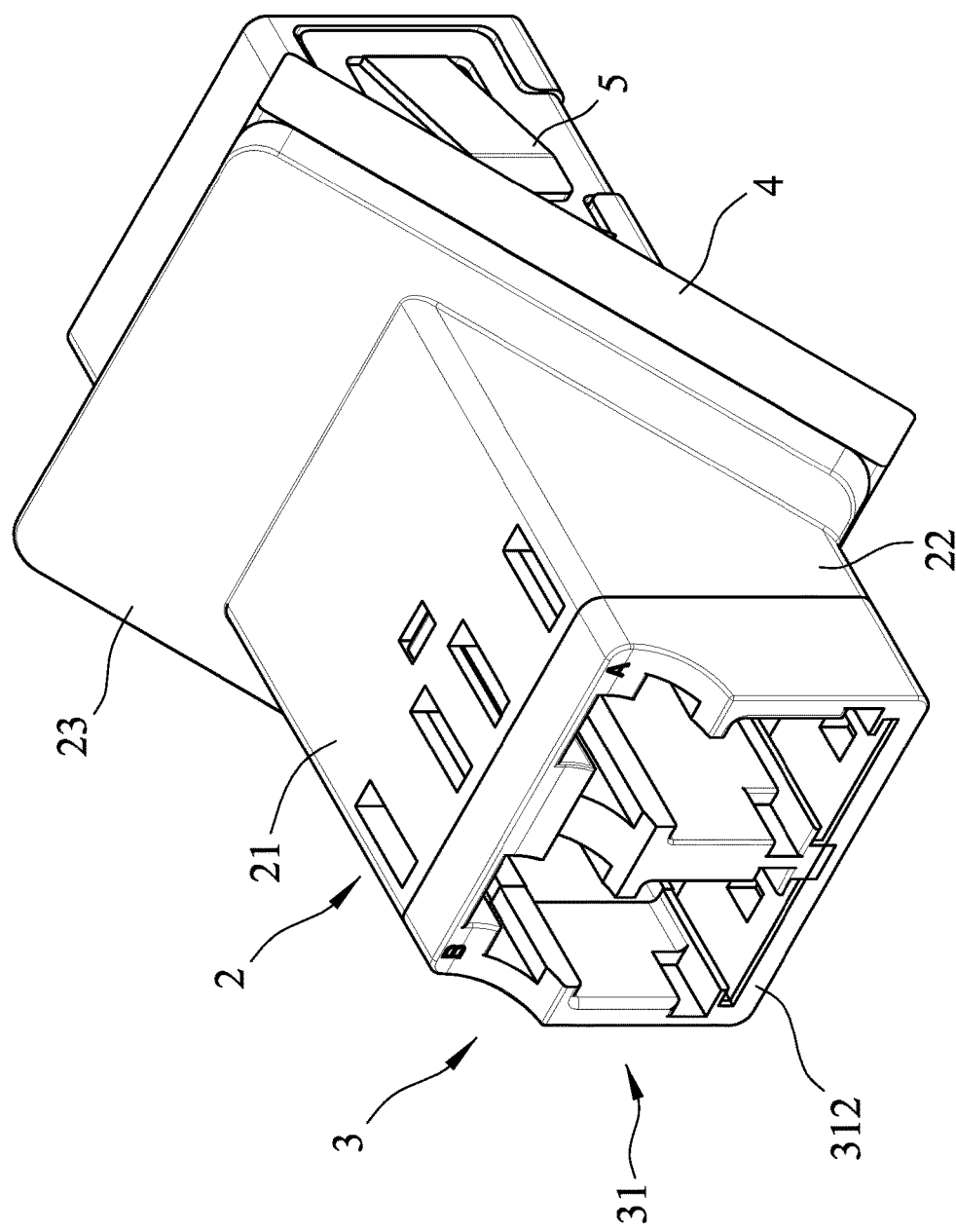
FIG. 8 is a perspective view illustrating a fiber optic adaptor assembly according to a third embodiment of the disclosure.

FIG. 8 illustrates a fiber optic adaptor assembly according to a third embodiment of the disclosure. The differences of the third embodiment reside in that the flange 23 is inclined with respect to one of the base plates 21, and the conductive ring member 4 is inclined together with the flange 23. By virtue of the inclination of the flange 23, the direction for inserting fiber optic connectors into the embodiment can be easily identified.

Figure 9A:
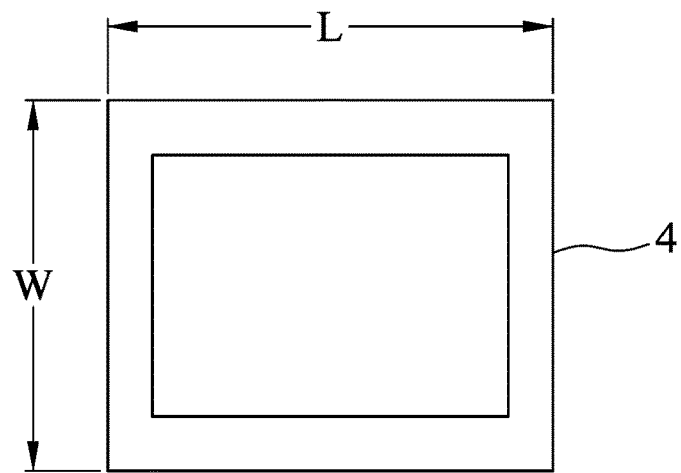
FIGS. 9A and 9B show an example of a conductive ring member used in the first to third embodiments.
Figure 9B:
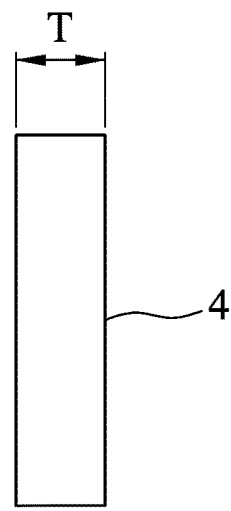

FIGS. 9A and 9B show an example of the conductive ring member 4 including a resilient cloth seal ring 41 made of conductive cloth, and an electrically conductive plating layer 42. The plating layer 42 has a thickness of about 0.08 mm and contains copper and nickel.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A fiber optic adaptor assembly to be inserted into a metal faceplate of a fiber distribution hub, comprising:
a main body formed with at least one installation hole;
at least one connector holder removably inserted into said at least one installation hole; and
a conductive ring member made from an electrically conductive material and removably sleeved around an outer periphery of said main body, wherein said conductive ring member electrically contacts and cooperates with the metal faceplate to provide a shielding effect against electromagnetic interferences when said main body is inserted into the faceplate;
wherein said main body including an inner surface facing said at least one installation hole, and at least one sliding track member that is formed on said inner surface in communication with said at least one installation hole and that extends in an insertion direction of said at least one connector holder, said at least one connector holder having an insertion portion extending into said at least one installation hole and slidably engaging said at least one sliding track member, and a frame-shaped head portion connected to one end of said insertion portion outwardly of said at least one installation hole.

2. The fiber optic adaptor assembly as claimed in claim 1, wherein said main body further includes two parallel spaced-apart base plates and two lateral plates each of which is connected between said base plates, said base plates and said lateral plates cooperatively bounding said at least one installation hole, each of said base plates having said inner surface facing said at least one installation hole, said at least one sliding track member including two sliding track members respectively formed on said inner surfaces of said base plates to slidably engage said insertion portion.

3. The fiber optic adaptor assembly as claimed in claim 2, wherein said sliding track members are slide grooves.

4. The fiber optic adaptor assembly as claimed in claim 1, wherein said at least one installation hole includes two installation holes, said main body further including two parallel spaced-apart base plates, two lateral plates each of which is connected between said base plates, and a partition plate that transversely connects between said base plates and that is disposed between said lateral plates, said base plates and said lateral plates cooperatively bounding said installation holes, said installation holes being respectively disposed on two opposite sides of said partition plate, said at least one sliding track member having two sliding track members respectively disposed in each of said base plates on the two opposite sides of said partition plate and extending in the insertion direction of said at least one connector holder, said at least one connector holder including two connector holders respectively inserted into said installation holes, said insertion portions of said connector holders extending into said installation holes and slidably engaging said sliding track members of said base plates, respectively.

5. The fiber optic adaptor assembly as claimed in claim 1, wherein said at least one connector holder further has two alignment sleeves which are respectively connected to two opposite sides of said insertion portion inside said at least one installation hole, said frame-shaped head portion having two connector-receiving openings respectively aligned with said alignment sleeves.

6. The fiber optic adaptor assembly as claimed in claim 1, wherein said conductive ring member includes a resilient seal ring that is made from a conductive cloth.

7. The fiber optic adaptor assembly as claimed in claim 1, wherein said main body further includes a flange that is looped around said base plates and said lateral plates, said conductive ring member being in contact with said flange.

8. The fiber optic adaptor assembly as claimed in claim 7, wherein said flange is inclined with respect to one of said base plates.

9. The fiber optic adaptor assembly as claimed in claim 1, further comprising a metal clip that is attached to said outer periphery of said main body in a clamping manner and that is able to interlock with the metal faceplate.

10. The fiber optic adaptor assembly as claimed in claim 1, wherein said at least one connector holder includes a plurality of connector holders with different identification colors.

11. A fiber optic adaptor assembly to be inserted into a metal faceplate of a fiber distribution hub, comprising:
a main body formed with at least one installation hole and configured to be inserted into the metal faceplate; and
at least one connector holder removably inserted into said at least one installation hole and configured to hold a fiber optic connector;
wherein said at least one connector holder includes an insertion portion inserted into said at least one installation hole, a frame-shaped head portion connected to said insertion portion outwardly of said at least one installation hole, and two alignment sleeves respectively connected to two opposite sides of said insertion portion inside said at least one installation hole, said frame-shaped head portion having two connector-receiving openings respectively aligned with said alignment sleeves, and a separation plate disposed between said connector-receiving openings, said insertion portion having an outer end connected to said separation plate of said frame-shaped head portion.

12. The fiber optic adaptor assembly as claimed in claim 11, wherein said at least one connector holder further includes two connecting plates respectively and transversely projecting from said two opposite sides of said insertion portion, said alignment sleeves being respectively disposed on said connecting plates.

13. The fiber optic adaptor assembly as claimed in claim 11, wherein said main body includes two spaced-apart base plates and two lateral plates each of which is connected between said base plates, said base plates and said lateral plates cooperatively bounding said at least one installation hole, each of said base plates having an inner surface, and a sliding track member that is formed on said inner surface and that extends in an insertion direction of said at least one connector holder, said insertion portion slidably engaging said sliding track member of each of said base plates.

14. The fiber optic adaptor assembly as claimed in claim 13, wherein said insertion portion has two opposite sliding engagement parts respectively and slidably engaging said sliding track members of said base plates, and a retention tongue resiliently projecting from said insertion portion for releasably interlocking with one of said base plates.

15. The fiber optic adaptor assembly as claimed in claim 11, wherein said insertion portion has an outer end connected to said separation plate of said frame-shaped head portion.

16. A fiber optic adaptor assembly to be inserted into a metal faceplate of a fiber distribution hub, comprising:
- a main body formed with at least one installation hole and configured to be inserted into the metal faceplate; and
- at least one connector holder removably inserted into said at least one installation hole and configured to hold a fiber optic connector;
- wherein said main body including an inner surface facing said at least one installation hole, and at least one sliding track member that is formed on said inner surface in communication with said at least one installation hole and that extends in an insertion direction of said at least one connector holder, said at least one connector holder having an insertion portion extending into said at least one installation hole and slidably engaging said at least one sliding track member, and a frame-shaped head portion connected to one end of said insertion portion outwardly of said at least one installation hole.

* * * * *